(12) United States Patent
Asai et al.

(10) Patent No.: US 8,132,262 B2
(45) Date of Patent: Mar. 6, 2012

(54) EXTERNAL MEMORY MANAGEMENT APPARATUS AND EXTERNAL MEMORY MANAGEMENT METHOD

(75) Inventors: Mao Asai, Kawasaki (JP); Makoto Hamatsu, Yokohama (JP); Tomoyuki Tamachika, Yokosuka (JP); Hirohito Taniguchi, Settsu (JP)

(73) Assignee: NTT DoCoMo, Inc., Tokyo (JP)

( * ) Notice: Subject to any disclaimer, the term of this patent is extended or adjusted under 35 U.S.C. 154(b) by 1322 days.

(21) Appl. No.: 11/519,886

(22) Filed: Sep. 13, 2006

(65) Prior Publication Data

US 2010/0030990 A1  Feb. 4, 2010

(30) Foreign Application Priority Data

Sep. 15, 2005  (JP) ................. P2005-268506

(51) Int. Cl.
*G06F 21/00*  (2006.01)
(52) U.S. Cl. ............ 726/27; 726/30; 713/176; 709/216; 380/270
(58) Field of Classification Search .............. 726/27; 713/176
See application file for complete search history.

(56) References Cited

U.S. PATENT DOCUMENTS

| | | | |
|---|---|---|---|
| 5,729,717 A | 3/1998 | Tamada et al. | |
| 5,850,599 A * | 12/1998 | Seiderman | 455/406 |
| 6,327,658 B1 | 12/2001 | Susaki et al. | |
| 6,944,478 B1 * | 9/2005 | Durand | 455/558 |
| 7,095,855 B1 * | 8/2006 | Collins | 380/241 |
| 7,203,967 B2 * | 4/2007 | Chmaytelli et al. | 726/30 |
| 7,322,043 B2 * | 1/2008 | Letsinger | 726/19 |
| 7,360,691 B2 * | 4/2008 | Takayama | 235/380 |
| 7,379,731 B2 * | 5/2008 | Natsuno et al. | 455/412.1 |
| 7,383,446 B1 * | 6/2008 | Hatanaka et al. | 713/193 |
| 7,415,729 B2 * | 8/2008 | Ukeda et al. | 726/26 |

(Continued)

FOREIGN PATENT DOCUMENTS

DE   199 25 195 A1   12/2000

(Continued)

OTHER PUBLICATIONS

"i-appli Contents Development Guide for DoJa-3.0 i-appli Option and i-appli Enlarged Edition", http://www.nttdocomo.co.jp/service/imode/make/content/iappli/technical_data/doja/doja30_opt/index.html, NTT DOCOMO, Inc., 3.2 Edition, pp. 1-56 (with English translation), Dec. 18, 2003.

(Continued)

*Primary Examiner* — Taghi Arani
*Assistant Examiner* — Morshed Mehedi
(74) *Attorney, Agent, or Firm* — Oblon, Spivak, McClelland, Maier & Neustadt, L.L.P.

(57) ABSTRACT

An objective is to prevent a downloaded application from accessing data in an external memory unrelated to the application, and to achieve safer management of access to the external memory. An external memory function module 15 is a function module that controls access of an application downloaded in a cell phone 1, to an external memory 2. This external memory function module 15 has a bind ID acquirer 156 for acquiring a bind ID to specify the application downloaded, a discrimination ID acquirer 157 for acquiring a directory discrimination ID to specify an application permitted to access a directory, and an access controller 158 for checking the bind ID against the directory discrimination ID and for, when they coincide with each other, performing such control as to permit access of the application to the directory.

4 Claims, 8 Drawing Sheets

U.S. PATENT DOCUMENTS

| | | | |
|---|---|---|---|
| 7,421,280 B2 * | 9/2008 | Rajkotia | 455/502 |
| 7,644,279 B2 * | 1/2010 | Rubin et al. | 713/176 |
| 7,793,355 B2 * | 9/2010 | Little et al. | 726/34 |
| 2005/0091535 A1 | 4/2005 | Kavalam et al. | |
| 2005/0097330 A1 * | 5/2005 | Lundblade | 713/176 |
| 2006/0136548 A1 * | 6/2006 | Nishio et al. | 709/203 |
| 2007/0033419 A1 * | 2/2007 | Kocher et al. | 713/193 |

FOREIGN PATENT DOCUMENTS

| | | |
|---|---|---|
| DE | 103 15 763 A1 | 11/2004 |
| EP | 0 547 741 A1 | 6/1993 |
| EP | 1 132 801 A2 | 9/2001 |
| EP | 1 164 747 A1 | 12/2001 |
| EP | 1 383 351 A2 | 1/2004 |
| EP | 1 548 667 A1 | 6/2005 |
| JP | 11-143840 | 5/1999 |
| JP | 2001-229018 | 8/2001 |
| JP | 2004-40717 | 2/2004 |
| JP | 2004-46307 | 2/2004 |
| JP | 2004-302995 | 10/2004 |
| JP | 2005-129063 | 5/2005 |
| WO | WO 99/18504 | 4/1999 |
| WO | WO 00/72149 A1 | 11/2000 |

OTHER PUBLICATIONS

Kenichi Kanbara, "J2ME for Business J2ME CLDC Business Programming", Java Press vol. 38, Gijutsu-Hyoron, Co., Ltd., Vo. 38, pp. 212-222 (with English translation), Sep. 2004.

* cited by examiner

Fig.2

| IDENTIFIER | IDENTIFICATION INFORMATION ABOUT APPLICATION A |
|---|---|
| AP-ID | www.aplication-a.com/download.html |
| CP-ID | Corp. AAA |
| : | : |

*Fig.3*

| IDENTIFIER | IDENTIFICATION INFORMATION ABOUT CELL PHONE |
|---|---|
| MODEL ID | MOBILE101 |
| SERIES ID | 1234 |
| UIM-ID | UIM-MOBILE101-1234 |
| : | : |

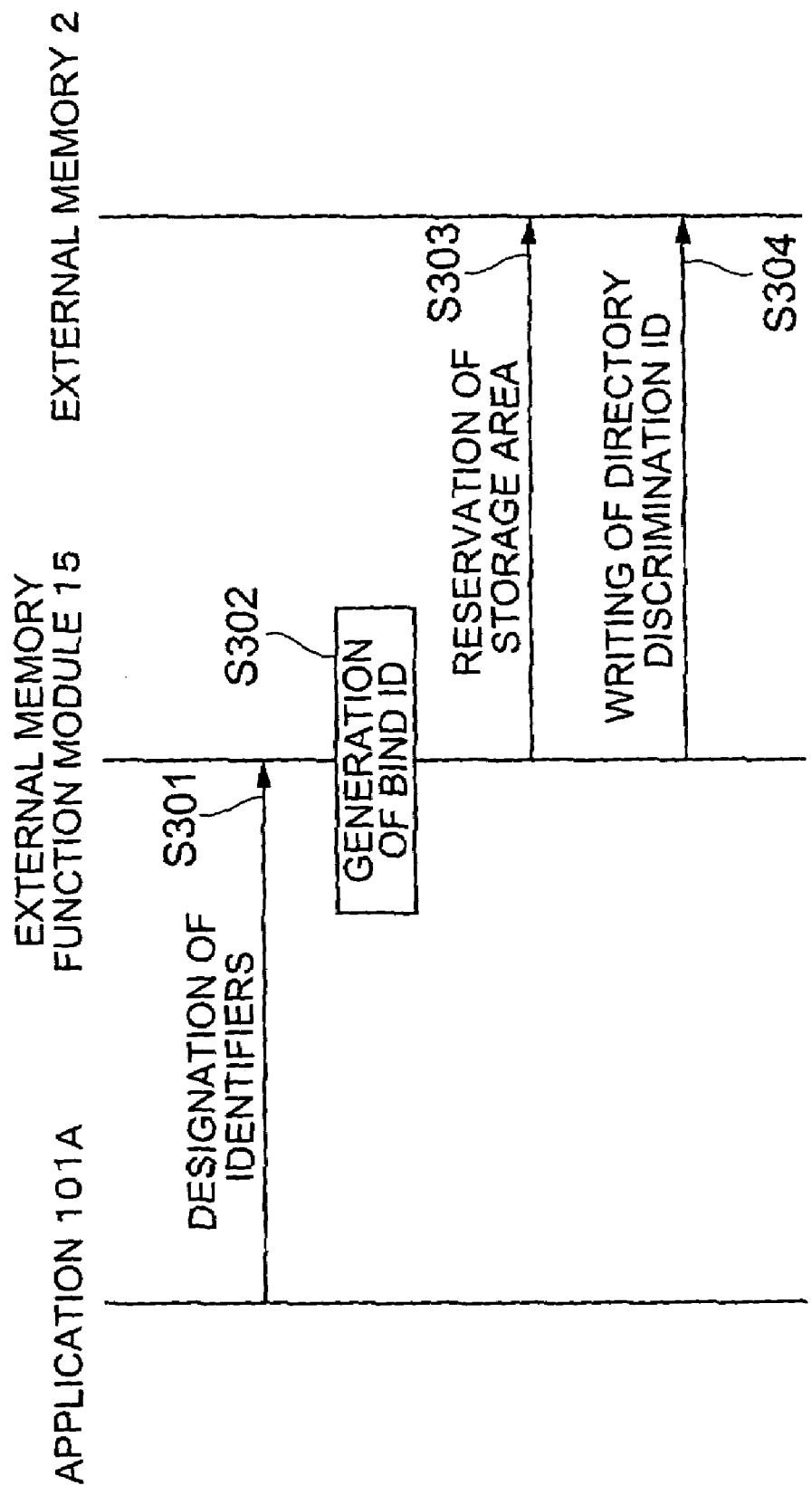

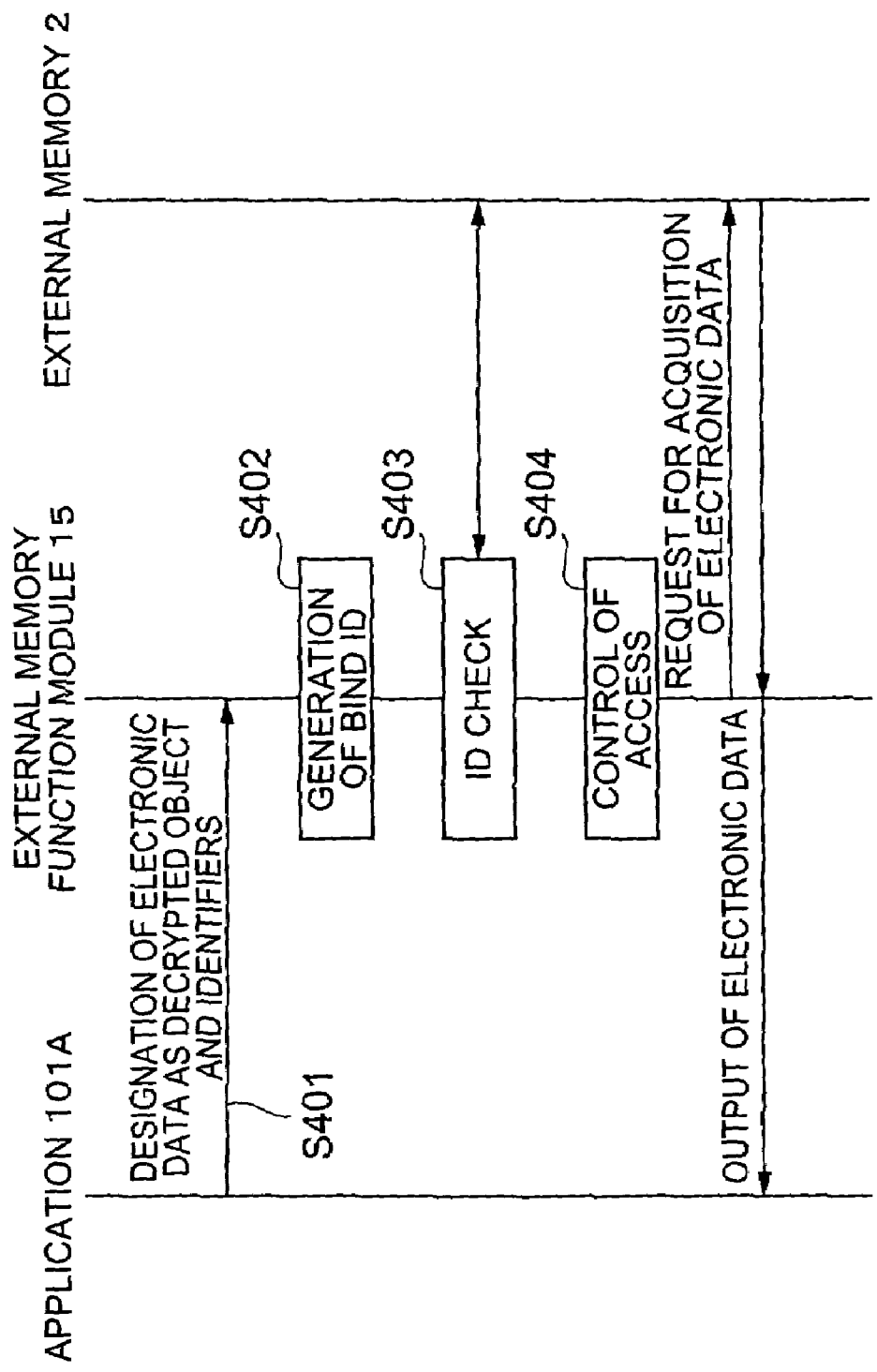

EXTERNAL MEMORY MANAGEMENT APPARATUS AND EXTERNAL MEMORY MANAGEMENT METHOD

BACKGROUND OF THE INVENTION

1. Field of the Invention

The present invention relates to an external memory management apparatus and external memory management method for controlling access of an application downloaded in a wireless communication terminal, to a removable external memory.

2. Related Background Art

As wireless communication terminals, e.g., cell phones increase diversity of their functionality in recent years, a required storage capacity is also increasing in order to implement the diversity of multiple functions. On the other hand, the wireless communication terminals are also being downsized, and there are thus cases where the whole required storage capacity cannot be located inside the wireless communication terminal. For this reason, for example, an external memory device has been and is being used in order to accept the increased storage capacity.

In use of such an external memory device, it is necessary to ensure security of data stored in the memory device and to implement such control that the data stored in the external memory device is available for a registered cell phone only, for example, as in the technology described in Patent Document 1 below. This Patent Document 1 describes that it is determined whether a key held by the cell phone coincides with a key held by the memory device and that use of the data stored in the specific memory device is limited to only the specific cell phone.

[Patent Document 1] Japanese Patent Application Laid-Open No. 2004-40717

SUMMARY OF THE INVENTION

Incidentally, the Internet-related functionality of wireless communication terminals is also becoming diversified in recent years, and applications used therein are also being diversified. In general, such applications are downloaded via the Internet from an unspecified large number of distributors. In a situation where a number of applications from different distributors are downloaded and used in a wireless communication terminal, it is also contemplated that an external memory device or the like is used in order to secure a storage capacity necessary for storage of data handled by the applications.

In such a situation, it is often the case that an identical external memory device is used among different types of applications downloaded from different creators, in view of simplicity of implementation and convenience of use. At this time, it is undesirable to unconditionally permit the different types of downloaded applications to access the same external memory and to decrypt data in the external memory unrelated to the applications, from the aspect of security management of the data stored in the external memory.

The present invention has been accomplished in view of the above circumstances and an object of the invention is to provide an external memory management apparatus and external memory management method capable of preventing a downloaded application from accessing data in an external memory unrelated to the application, and achieving safer management of access to the external memory.

In order to solve the above problem, an external memory management apparatus of the present invention is an external memory management apparatus for controlling access of an application downloaded in a wireless communication terminal, to a removable external memory, comprising: specific information acquiring means for acquiring specific information to specify the application downloaded; attribute information acquiring means for acquiring attribute information to specify an application permitted to access a predetermined area in the external memory; and access controlling means for checking the specific information acquired by the specific information acquiring means, against the attribute information acquired by the attribute information acquiring means, and for, when the specific information coincides with the attribute information, performing such control as to permit access of the downloaded application to the predetermined area.

An external memory management method of the present invention is an external memory management method of controlling access of an application downloaded in a wireless communication terminal, to a removable external memory, comprising: a specific information acquiring step wherein specific information acquiring means acquires specific information to specify the application downloaded; an attribute information acquiring step wherein attribute information acquiring means acquires attribute information to specify an application permitted to access a predetermined area in the external memory; and an access controlling step wherein access controlling means checks the specific information acquired in the specific information acquiring step, against the attribute information acquired in the attribute information acquiring step and, when the specific information coincides with the attribute information, the access controlling means performs such control as to permit access of the downloaded application to the predetermined area.

In the external memory management apparatus and external memory management method of the present invention as described above, the attribute information contains the information to specify the application permitted to access the area in the external memory with the attribute information. Then the access controlling means checks the specific information of the downloaded application against the attribute information of the predetermined area in the external memory. For this reason, the access controlling means is able to perform such control as to permit the application to access only the area with the attribute information coinciding with the specific information. Therefore, the downloaded application can be prevented from accessing data in the external memory unrelated to the application.

The external memory management apparatus of the present invention is preferably configured as follows: the external memory management apparatus further comprises identifier acquiring means for acquiring an identifier from the application downloaded; and specific information generating means for generating the specific information, based on identification information designated by the identifier acquired by the identifier acquiring means; wherein the specific information acquiring means acquires the specific information generated by the specific information generating means.

According to the present invention, only the identifier, i.e., only a type of pertinent identification information is acquired from the application downloaded in the wireless communication terminal. Then the specific information generating means generates the specific information peculiar to the application, based on the identification information designated by this identifier. When the specific information peculiar to the application is not generated by the application, but generated by the specific information generating means in the present invention as described above, it is feasible, for example, to prevent another unauthorized application not sharing data with the application, from falsifying and assuming the specific information without permission.

In the external memory management apparatus of the present invention, preferably, the identifier acquiring means acquires from the application an application identifier to identify the application and a wireless communication terminal identifier to identify the wireless communication terminal, the specific information generating means generates specific information to specify the application and the wireless communication terminal, based on application identification information designated by the application identifier and based on wireless communication terminal identification information designated by the wireless communication terminal identifier, and the attribute information contains information to specify an application and a wireless communication terminal permitted to access a predetermined area in the external memory associated with the attribute information.

According to the present invention, the apparatus uses the application identification information and the wireless communication terminal identification information as the identification information being a basis for generation of the specific information. Furthermore, the information to specify the application permitted to access the area and the wireless communication terminal in which the application is used is recorded in the attribute information associated with the predetermined area in the external memory. For this reason, the access controlling means is able to perform such control as to permit the application and the wireless communication terminal to access the predetermined area in the external memory with the attribute information coinciding with the specific information.

The present invention prevents a downloaded application from accessing data in the external memory unrelated to the application, and enables safer management of access to the external memory.

BRIEF DESCRIPTION OF THE DRAWINGS

FIG. 2 is a drawing to illustrate an example of data stored in ADF 102A.

FIG. 3 is a drawing to illustrate an example of data stored in UIM 13 or in management information storage 14.

FIG. 7 is a sequence diagram to illustrate an operation of external memory function module 15 in FIG. 1.

FIG. 8 is a sequence diagram to illustrate an operation of external memory function module 15 in FIG. 1.

DESCRIPTION OF THE PREFERRED EMBODIMENTS

The present invention can be readily understood in view of the following detailed description with reference to the accompanying drawings presented by way of illustration only. Subsequently, embodiments of the present invention will be described with reference to the accompanying drawings. An embodiment of the present invention will be described below using an example of a situation where the external memory management apparatus of the present invention is mounted and used as an external memory function module in a cell phone as a wireless communication terminal. This external memory function module operates as a function module to control access of an application downloaded in a cell phone, to a removable external memory. The same portions will be denoted by the same reference symbols as much as possible, without redundant description.

Figure 1:
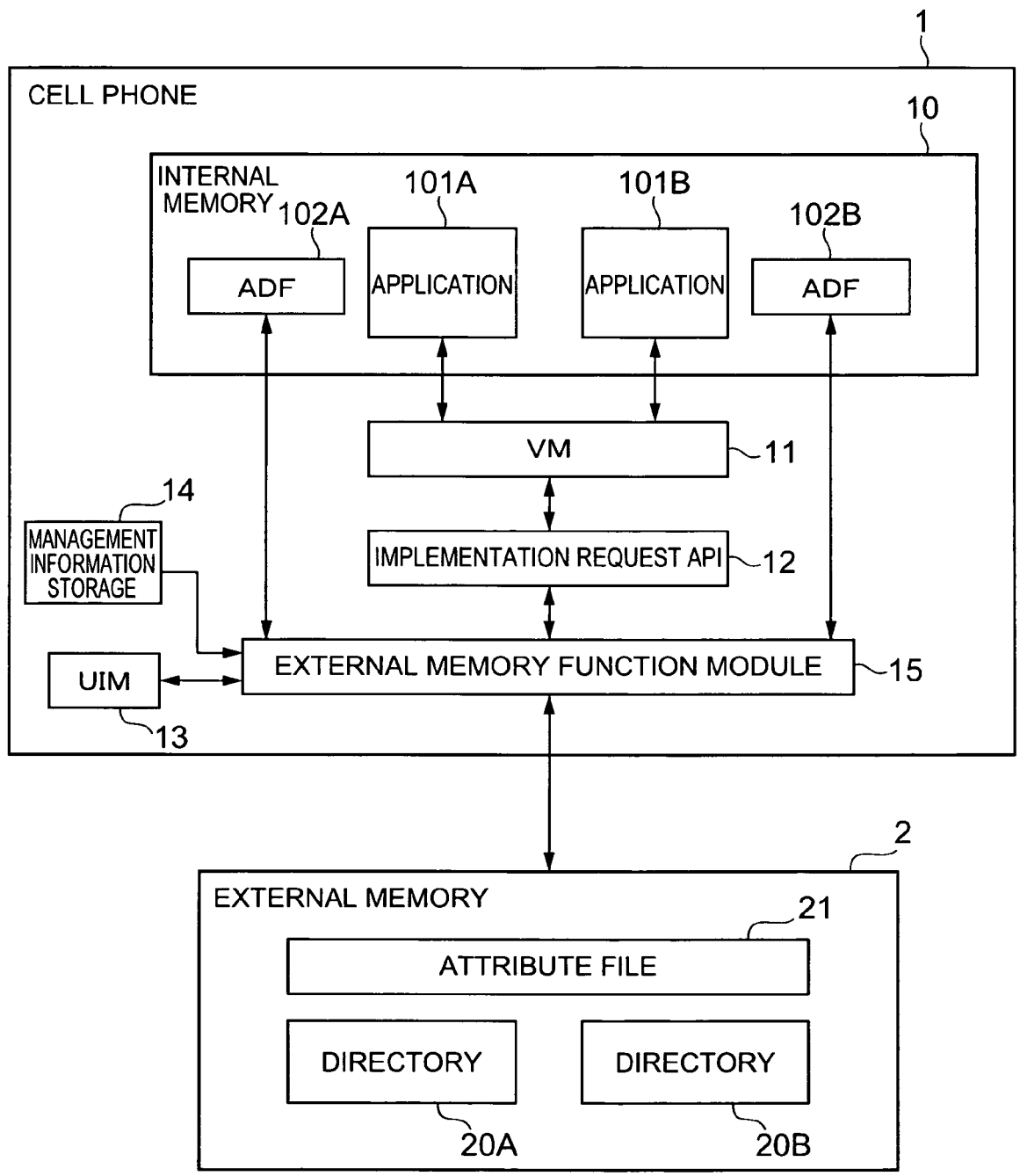
FIG. 1 is a schematic diagram to illustrate a configuration of cell phone 1 incorporating external memory function module 15 according to an embodiment of the present invention.

First, a configuration of cell phone 1 in which the external memory function module 15 according to the embodiment of the present invention is mounted, will be described with reference to FIG. 1. FIG. 1 is a schematic diagram of the configuration of cell phone 1. As shown in FIG. 1, the cell phone 1 is composed of internal memory 10, VM 11 (Virtual Machine), implementation request API (Application Program Interface) 12, UIM 13 (User Identity Module), management information storage 14, and external memory function module 15. Each of the components of the cell phone 1 will be described below in detail.

Stored in the internal memory 10 are applications 101A and 101B, and ADFs (Attribute Definition Files) 102A and 102B corresponding to the applications 101A and 101B. This internal memory 10 is configured to be able to transmit and receive information to and from the external memory function module 15.

The applications 101A and 101B stored in the internal memory 10 are applications that were downloaded via the Internet from an unspecified large number of contents providers, for example, by a downloading means (not shown) of cell phone 1 and that are stored in an operable state in cell phone 1. Namely, the applications downloaded are supplied from different distributors and data handled by each application is not shared, for example, between application 101A and application 101B. These applications 101A and 101B are implemented so as to operate on VM 11 and implementation request API 12. VM 11 is software, for example, that performs transformation of formats so that the applications 101A and 101B are workable on an OS (Operating System) of cell phone 1. API 12 is so-called middleware that provides functionality of common use among applications.

ADFs 102A and 102B contain data about attributes of the applications 101A and 101B. Specifically, each of the ADFs 102A and 102B contains a record of an AP-ID for identification of the application, a CP-ID for identification of a contents provider having produced and distributed the application, and so on.

FIG. 2 shows an example of data recorded in the ADF 102A. As shown in FIG. 2, the AP-ID is identification information for the application 101A, for example, a URL (e.g., "www.aplication-a.com/download.html") of a download source of the application 101A, in the form of digitized data of the URL according to a predetermined arithmetic. The CP-ID is identification information for the contents provider, e.g., a name of the contents provider having produced and distributed the application 101A (e.g., "Corp. AAA"), in the form of digitized data of the name according to a predetermined arithmetic. The above-described AP-ID and CP-ID as names of types of information correspond to the application identifier in the present invention. Furthermore, "www.aplication-a.com/download.html" and "Corp. AAA" as actual contents of information designated by the application identifier correspond to the application identification information in the present invention.

The UIM 13 is constructed, for example, of an IC card and is removably mounted in a card slot (not shown) of cell phone 1. The management information storage 14 is, for example, a storage device in cell phone 1 and is constructed, for example, of a ROM (Read Only Memory). Stored in the UIM 13 or in the management information storage 14 is data about attributes of the cell phone 1 such as subscriber information. FIG. 3 shows an example of data stored in UIM 13 or in management information storage 14. As shown in FIG. 3, the UIM 13 or management information storage 14 stores digital data such as a model ID ("MOBILE101") indicating a model of the cell phone 1, a series ID ("1234") indicating a series number of the cell phone 1, a UIM-ID ("UIM-MOBILE101-1234") for identification of UIM 13, and so on. The UIM 13 and management information storage 14 are implemented so as to be able to transmit and receive information to and from the external memory function module 15. The above-described model ID, series ID, UIM-ID, and so on as names of types of information correspond to the wireless communication terminal identifier in the present invention. Furthermore, "MOBILE101," "1234," "UIM-MOBILE101-1234," and so on as actual contents of information designated by the wireless communication terminal identifier correspond to the wireless communication terminal identification information in the present invention.

Figure 4:
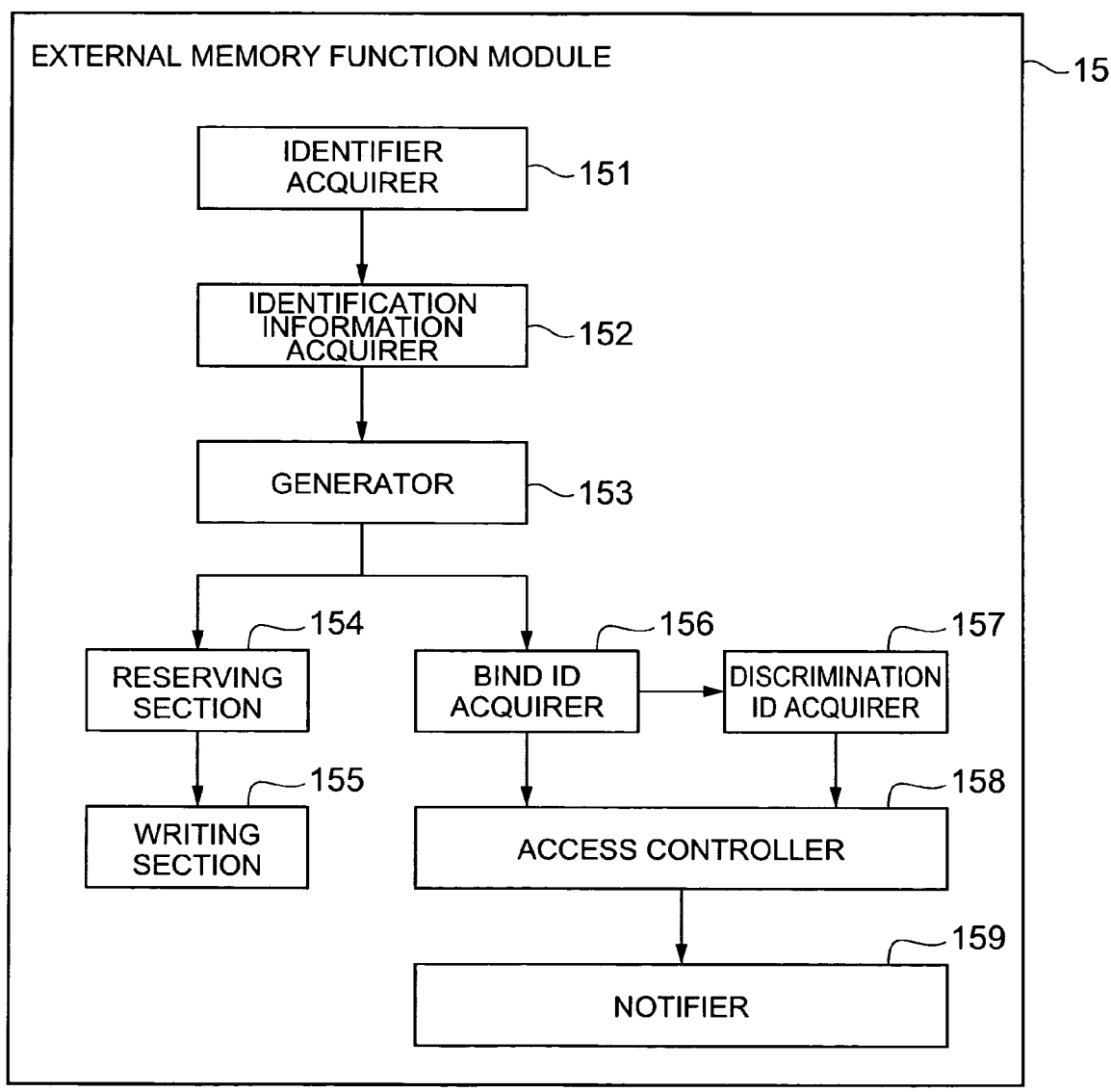
FIG. 4 is a schematic diagram to illustrate a configuration of external memory function module 15 in FIG. 1.

Returning to FIG. 1, the external memory function module 15 is a function module that controls access of the downloaded applications 101A and 101B to the removable external memory 2. FIG. 4 is a schematic diagram of a configuration of this external memory function module 15. As shown in FIG. 4, the external memory function module 15 is composed of identifier acquirer (identifier acquiring means) 151, identification information acquirer 152, generator (specific information generating means) 153, reserving section 154, writing section 155, bind ID acquirer (specific information acquiring means) 156, discrimination ID acquirer (attribute information acquiring means) 157, access controller (access controlling means) 158, and notifier 159. Each of the components of the external memory function module 15 will be described below in detail.

The identifier acquirer 151 is a part that acquires an identifier such as an application identifier or a wireless communication terminal identifier designated by the applications 101A and 101B. Namely, when the applications 101A and 101B designate, for example, one or more of the AP-ID, CP-ID, model ID, series ID, and UIM-ID as an application identifier or wireless communication terminal identifier, the identifier acquirer 151 acquires the identifier designated and outputs it to the identification information acquirer 152. Which identifier is designated by the applications 101A and 101B is determined according to a predetermined rule between the applications and the external memory function module 15. In order to ensure the security, none except for the applications is informed of this rule.

The identification information acquirer 152 accepts input of the identifiers designated by the applications 101A and 101B, from the identifier acquirer 151, and acquires the identification information corresponding to the input of identifiers from the ADFs 102A and 102B, UIM 13, or management information storage 14. More specifically, for example, supposing the application 101A designates the AP-ID and CP-ID as the application identifier, the identification information acquirer 152 acquires the digital data of "www.aplication-a.com/download.html" and "Corp. AAA" recorded in the ADF 102A, as the application identification information corresponding to the AP-ID and CP-ID. In a case where the application 101A designates the model ID, series ID, and UIM-ID as the wireless communication terminal identifier, the identification information acquirer 152 acquires the digital data of "MOBILE101," "1234," and "UIM-MOBILE101-1234" stored in UIM 13 or in management information storage 14, as the wireless communication terminal identification information corresponding to the model ID, series ID, and UIM-ID. Then the identification information acquirer 152 outputs to the generator 153 the application identification information and the wireless communication terminal identification information acquired in this manner.

The generator 153 generates a bind ID (specific information) to specify the application and the cell phone 1 on which the application is mounted, based on the application identification information and the wireless communication terminal identification information fed from the identification information acquirer 152. The present embodiment adopts a well-known hash function as a generation algorithm for the bind ID used in this operation. Namely, in a case where the application identification information and the wireless communication terminal identification information supplied is "www.aplication-a.com/download.html," "Corp. AAA," "MOBILE101," "1234," and "UIM-MOBILE101-1234," the generator 153 uses the identification information as arguments of the hash function to obtain a hash value and defines the hash value as a bind ID of the application. This hash function is appropriately selected, for example, in view of a security level of the external memory management or simplicity of implementation. The generator 153 outputs the bind ID generated in this manner, to the writing section 155 and to the bind ID acquirer 156.

The reserving section 154 is a part that reserves a predetermined area in the external memory 2 as a directory (storage area) available for each of the applications 101A and 101B. The external memory 2 to be used in the present embodiment is, for example, a general-purpose removable memory device such as the SD memory card (Secure Digital Memory Card), SmartMedia (registered trademark), or Compact Flash (registered trademark). As shown in FIG. 1, a number of directories, e.g., directories 20A and 20B, can be made in this external memory 2, and the reserving section 154 reserves the directories thus made, as storage areas for the respective applications. In the present embodiment, the reserving section 154 reserves directory 20A as a storage area available for the application 101A, and reserves directory 20B as a storage area available for the application 101B.

The writing section 155 is a part that writes the bind ID generated by the generator 153, as a discrimination ID of each directory in an attribute file (attribute information) 21 of the external memory 2. Namely, for example, when the reserving section 154 reserves the directory 20A as a storage area available for the application 101A, the writing section 155 writes the bind ID generated by the generator 153 on the basis of the identification information corresponding to the identifier designated by the application 101A, as a discrimination ID of the directory 20A in the attribute file 21.

The bind ID acquirer 156 is a part that acquires the bind ID generated by the aforementioned generator 153. The bind ID acquirer 156 outputs the acquired bind ID to the access controller 158.

The discrimination ID acquirer 157 is, for example, a part that receives an indication signal to indicate acquisition of the bind ID from the bind ID acquirer 156 and thereafter acquires the discrimination ID of the directory written in the attribute file 21 of the external memory 2 by the aforementioned writing section 155. The discrimination ID acquirer 157 outputs the acquired discrimination ID of the directory to the access controller 158.

The access controller 158 is a part that controls access of applications 101A and 101B downloaded via the Internet from an unspecified large number of contents providers, to the directories 20A and 20B in the external memory 2. Specifically, the access controller 158 checks the directory discrimination ID fed from the discrimination ID acquirer 157, against the bind ID fed from the bind ID acquirer 156. When the result of this check is that the directory discrimination ID coincides with the bind ID, the access controller 158 performs such control as to permit the application to access the directory. Namely, the access controller 158 extracts, for example, electronic data under a request for decryption by the application, from the directory in the external memory 2 and outputs it to the application. The external memory function module 15 further comprises decryption requested data importing means (not shown). This decryption requested data importing means imports information to specify electronic data as an object under the request for decryption, from the application, and exports the information to the controller 158.

On the other hand, when the result of the above check is that the directory discrimination ID does not coincide with the bind ID, the access controller 158 performs such control as to inhibit access of the application to the directory. Namely, the access controller 158 does not extract, for example, the electronic data under the request for decryption by the application from the directory in the external memory 2, and outputs information to indicate the inhibition of access of the application to the directory, to notifier 159.

The notifier 159 is a part that imports information indicating permission/inhibition of access of the application to the directory from the access controller 158 and that notifies the application of the information. The application receiving the notification information can determine which area it is allowed to access in the external memory 2.

Figure 5:
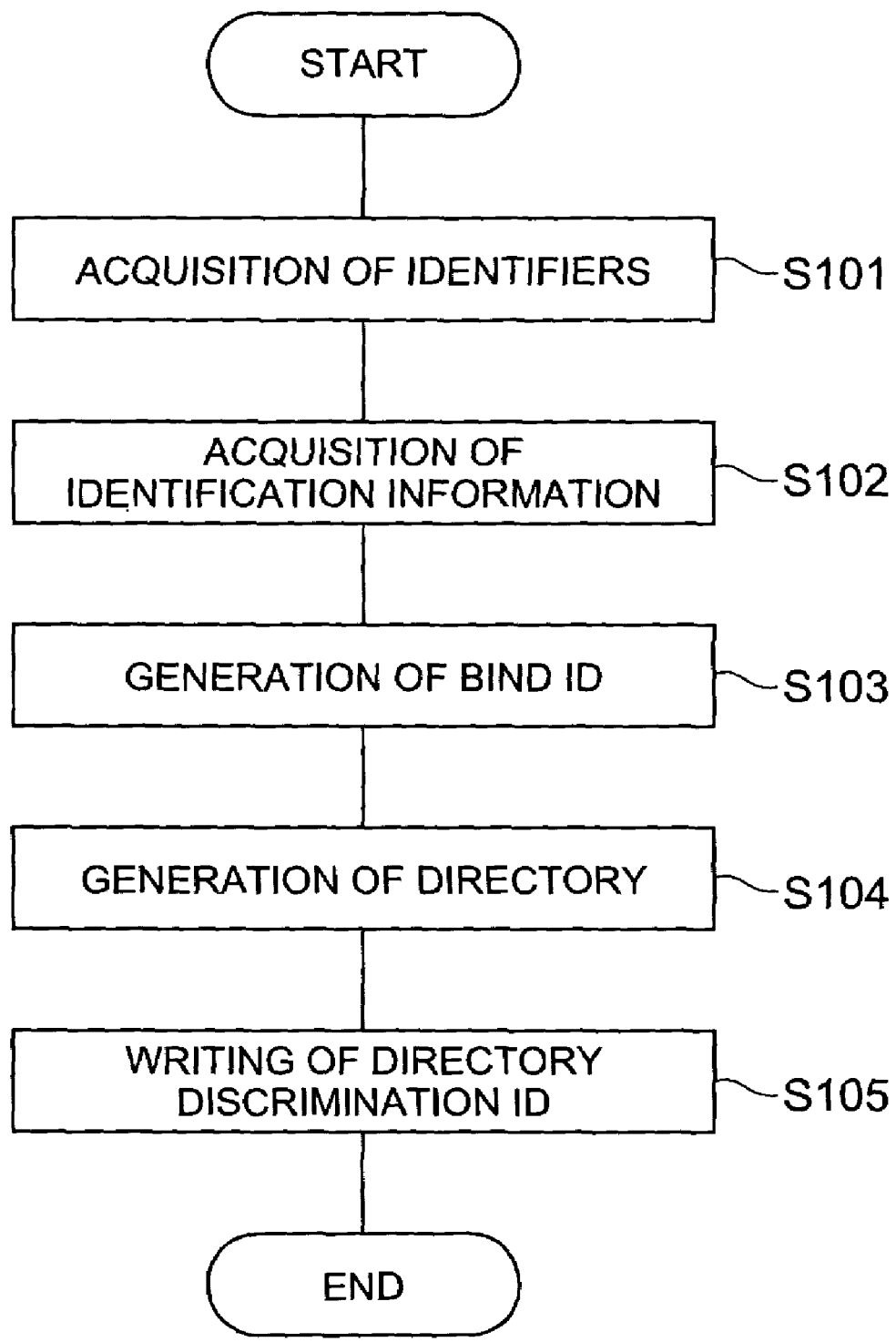
FIG. 5 is a flowchart to illustrate an operation of external memory function module 15 in FIG. 1.

Subsequently, the operation (external memory management method) carried out by the external memory function module 15 of the present embodiment as described above will be described in detail with reference to the flowcharts of FIG. 5 and FIG. 6. FIG. 5 is a flowchart for explaining the operation of the external memory function module 15 in a situation in which the directory 20A is reserved as a storage area for the application 101A.

In FIG. 5, first, the application 101A designates the AP-ID, CP-ID, model ID, series ID, and UIM-ID as the application identifier and the wireless communication terminal identifier, and then the identifier acquirer 151 acquires the identifiers thus designated. Then the identifiers thus acquired are fed to the identification information acquirer 152 (step S101).

Next, the identification information acquirer 152 acquires the identification information corresponding to the identifiers acquired at step S101, from the ADF 102A, UIM 13, or management information storage 14. Specifically, the identification information acquirer 152 acquires from the ADF 102A, the digital data of "www.aplication-a.com/download.html" corresponding to the AP-ID of the application identifier and the digital data of "Corp. AAA" corresponding to the CP-ID, as the application identification information. Furthermore, the identification information acquirer 152 acquires from the UIM 13 or from the management information storage 14, the digital data of "MOBILE101" corresponding to the model ID of the wireless communication terminal identifier, the digital data of "1234" corresponding to the series ID, and the digital data of "UIM-MOBILE101-1234" corresponding to the UIM-ID, as the wireless communication terminal identification information. Then the acquirer 152 feeds the application identification information and the wireless communication terminal identification information acquired in this manner, to the generator 153 (step S102).

The generator 153 generates the bind ID to specify the application 101A and the cell phone 1, based on the identification information acquired at step S102, using the predetermined hash function. On this occasion, the identification information fed to the generator 153 at step S102 is used as arguments in the hash function, and a hash value calculated is defined as the bind ID. Then the bind ID generated in this manner is fed to the writing section 155 (step S103).

Next, the reserving section 154 reserves the directory 20A in the external memory 2 not allocated yet to another application, as a storage area available for the application 101A (step S104).

Next, the writing section 155 writes the bind ID generated at step S103, as a discrimination ID of the directory 20A reserved at step S104, in the attribute file 21 of the external memory 2 (step S105). This associates the directory 20A with only the application 101A. Furthermore, since the bind ID is not generated by the application 101A but generated by the generator 153, it is feasible, for example, to prevent another application not sharing data with the application 101A, from falsifying and assuming this bind ID without permission.

Figure 6:
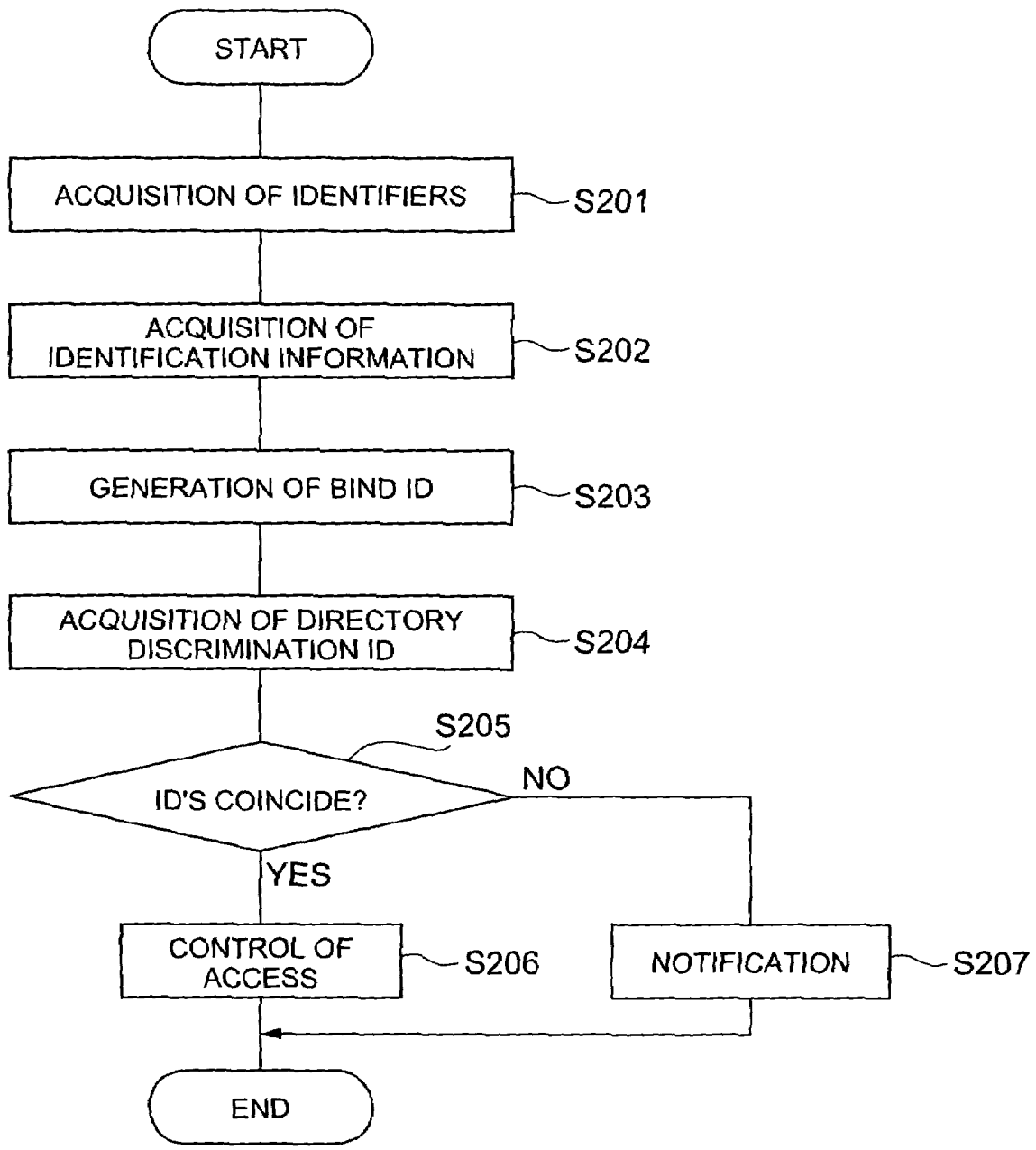
FIG. 6 is a flowchart to illustrate an operation of external memory function module 15 in FIG. 1.

FIG. 6 is a flowchart for explaining the operation of the external memory function module 15 in the case where the application 101A is allowed to access the directory 20A.

In FIG. 6, first, the application 101A designates the AP-ID, CP-ID, model ID, series ID, and UIM-ID as the application identifier and the wireless communication terminal identifier, and then the identifier acquirer 151 acquires the identifiers thus designated. Then the identifiers thus acquired are fed to the identification information acquirer 152 (step S201).

Next, the identification information acquirer 152 acquires the identification information corresponding to the identifiers acquired at step S201, from the ADF 102A, UIM 13, or management information storage 14. Specifically, the identification information acquirer 152 acquires from the ADF 102A, the digital data of "www.aplication-a.com/download.html" corresponding to the AP-ID of the application identifier and the digital data of "Corp. AAA" corresponding to the CP-ID, as the application identification information. Furthermore, the identification information acquirer 152 acquires from the UIM 13 or from the management information storage 14, the digital data of "MOBILE101" corresponding to the model ID of the wireless communication terminal identifier, the digital data of "1234" corresponding to the series ID, and the digital data of "UIM-MOBILE101-1234" corresponding to the UIM-ID, as the wireless communication terminal identification information. Then the acquirer 152 feeds the application identification information and the wireless communication terminal identification information acquired in this manner, to the generator 153 (step S202).

The generator 153 generates the bind ID to specify the application 101A and the cell phone 1, on the basis of the identification information acquired at step S202, using the predetermined hash function. On this occasion, the identification information fed to the generator 153 at step S202 is used as arguments in the hash function, and a hash value calculated is defined as the bind ID. Then the bind ID generated in this manner is fed through the bind ID acquirer 156 to the access controller 158 (step S203).

Next, the discrimination ID acquirer 157 acquires the directory discrimination ID written in the attribute file 21 of the external memory 2 by the writing section 155 at the aforementioned step S105. The directory discrimination ID acquired is fed to the access controller 158 (step S204).

Next, the bind ID fed at step S203 is checked against the directory discrimination ID fed at the step S204 (step S205). When the result of the check at step S205 is that the directory discrimination ID coincides with the bind ID, the access controller 158 performs such control as to permit access of the application 101A to the directory 20A (step S206). This permits the application 101A to access and decrypt the data stored in the directory 20A.

On the other hand, when the result of the check at step S205 is that the directory discrimination ID does not coincide with the bind ID, the access controller 158 performs such control as to inhibit access of the application 101A to the directory 20A. Then the notifier 159 notifies the application 101A of notification information to indicate the inhibition of access of the application 101A to the directory 20A (step S207).

Subsequently, the action and effect of the present embodiment will be described with reference to FIGS. 7 and 8. FIG. 7 is a sequence diagram for explaining the operation of the external memory function module 15, for example, in a situation in which the directory 20A is reserved as a storage area for the application 101A. As shown in FIG. 7, only the identifier, i.e., only the type of relevant identification information is acquired from the application 101A downloaded in the cell phone 1 (step S301). Then the external memory function module 15 generates the bind ID, based on the identification information designated by this identifier (step S302). Since the bind ID as the specific information peculiar to the application 101A and the cell phone 1 is not generated by the application 101A side but generated by the external memory function module 15 side of the present embodiment as described above, it is feasible, for example, to prevent another application not sharing data with the application 101A, from falsifying and assuming this bind ID without permission.

The external memory function module 15 reserves the directory 20A for the application 101A in the external memory 2 (step S303) and writes the bind ID as a discrimination ID for the directory 20A in the attribute file 21 (step S304). Therefore, it becomes feasible to write the information restricted to the application 101A only, in the attribute file 21, and thus the use of the directory 20A with the attribute file 21 can be limited to the application 101A only.

FIG. 8 is a sequence diagram for explaining the operation of the external memory function module 15, for example, in a situation in which the application 101A is allowed to access the directory 20A. As shown in FIG. 8, the application 101A designates electronic data as an object for decryption and an identifier for generation of the bind ID (step S401), and then the external memory function module 15 checks the directory discrimination ID recorded in the attribute file 21 of the external memory 2, against the bind ID generated by the external memory function module 15 itself on the basis of the identifier designated at step S401 (step S402 and step S403). The directory discrimination ID preliminarily contains a record of information to specify the application permitted to access the directory 20A with the directory discrimination ID. For this reason, the external memory function module 15 is able to perform such control as to permit the application 101A to access only the directory with the directory discrimination ID coinciding with the bind ID (step S404). The control on this occasion is carried out, for example, in such a manner that the external memory function module 15 extracts the electronic data under the request for decryption from the directory 20A and transfers it to the application 101A. Therefore, it is feasible to prevent a downloaded application from extracting data in the external memory 2 unrelated to the application and from becoming able to decrypt the data.

The present embodiment uses the application identification information such as the AP-ID and CP-ID, and the wireless communication terminal identification information such as the model ID, series ID, and UIM-ID, as the identification information being a basis for generation of the bind ID. Furthermore, the information to specify the application permitted to access the area and the cell phone 1 using the application is recorded in the attribute file 21 in the external memory 2. For this reason, the access controller 158 is able to perform such control as to permit the application and the cell phone 1 to access the directory with the directory discrimination ID coinciding with the bind ID.

The preferred embodiment of the present invention was described above, but it is needless to mention that the present invention is by no means limited to the above embodiment.

For example, in the present embodiment the external memory function module 15 is provided with the identifier acquirer 151, identification information acquirer 152, and generator 153, and the bind ID is generated in the external memory function module 15. However, for example, for convenience of implementation or the like, the bind ID may be generated on the downloaded application side, and the bind ID acquirer 156 in the present embodiment may be configured to acquire the bind ID from the application. In this case, the present invention achieves the same effects above, and thus is able to prevent a downloaded application from decrypting data in the external memory 2 unrelated to the application.

Furthermore, the present embodiment used the cell phone 1 as a wireless communication terminal, but, without having to be limited to it, the present invention can also be readily applied to so-called portable terminals such as PDA (Personal Digital Assistance).

The present embodiment was provided with one attribute file 21 corresponding to the whole of the external memory 2, but it is also possible to provide separate attribute files for a large number of respective directories in the external memory 2.

The directory discrimination ID may also be configured to further contain a memory address or the like on the external memory 2 for each directory reserved by the reserving section 154, in addition to the information contained in the bind ID.

What is claimed is:

1. An external memory management apparatus for controlling access of an application downloaded in a wireless communication terminal to a removable external memory, the external memory management apparatus comprising:

identifier acquiring means for acquiring an application identifier identifying a type name of application identification information from the downloaded application and a wireless communication terminal identifier identifying a type name of wireless communication terminal identification information;

contents acquiring means acquires a contents of the application identification information and the wireless communication terminal identification information designated by the type name of the application identification information and the type name of the wireless communication terminal identification information acquired by the identifier acquiring means;

specific information generating means for generating a bind ID based on the contents acquired by the contents acquiring means;

specific information acquiring means for acquiring the bind ID identifying the downloaded application and the wireless communication terminal on which the application is mounted;

attribute information acquiring means for acquiring attribute information identifying at least one of an application and a wireless communication terminal having permission to access a predetermined area in the removable external memory for storing the downloaded application; and access controlling means for comparing the bind ID with the attribute information, for permitting a transfer of the downloaded application to the predetermined area in the removable external memory when the bind ID matches the attribute information, and for preventing a transfer of the downloaded application to the predetermined area in the removable external memory when the bind ID does not match the attribute information.

2. An external memory management method of controlling access of an application downloaded in a wireless communication terminal to a removable external memory, the method comprising:

acquiring an application identifier identifying a type name of application identification information from the downloaded application and a wireless communication terminal identifier identifying a type name of wireless communication terminal identification information;

acquiring contents of the application identification information and the wireless communication terminal identification information designated by the type name of the application identification information and the type name of the wireless communication terminal identification information acquired by the identifier acquiring means;

generating a bind ID based on the acquired contents of the application identification information and the wireless communication terminal identification information acquiring the generated bind ID and identifying the downloaded application and the wireless communication terminal on which the application is mounted;

acquiring attribute information identifying at least one of an application and a wireless communication terminal having permission to access a predetermined area in the removable external memory for storing the downloaded application; and comparing the bind ID with the attribute information, permitting a transfer of the downloaded application to the predetermined area in the removable external memory when the bind ID matches the attribute information, and preventing a transfer of the downloaded application to the predetermined area in the removable external memory when the bind ID does not match the attribute information.

3. An external memory management apparatus for controlling access of an application downloaded in a wireless communication terminal to a removable external memory, the external memory management apparatus comprising:

identifier acquiring means for acquiring an application identifier identifying a type name of application identification information from the downloaded application and a wireless communication terminal identifier identifying a type name of wireless communication terminal identification information;

contents acquiring means for acquiring contents of the application identification information and the wireless communication terminal identification information designated by the type name of the application identification information and the type name of the wireless communication terminal identification information acquired by the identifier acquiring means;

specific information acquiring means for acquiring a bind ID from the downloaded application, the bind ID generated based on the contents acquired by the contents acquiring means, the bind ID identifying the downloaded application and the wireless communication terminal on which the application is mounted;

attribute information acquiring means for acquiring attribute information identifying at least one of an application and a wireless communication terminal having permission to access a predetermined area in the removable external memory for storing the downloaded application; and access controlling means for comparing the bind ID with the attribute information, for permitting a transfer of the downloaded application to the predetermined area in the removable external memory when the bind ID matches the attribute information, and for preventing a transfer of the downloaded application to the predetermined area in the removable external memory when the bind ID does not match the attribute information.

4. An external memory management apparatus for controlling access of an application downloaded in a wireless communication terminal to a removable external memory, the external memory management apparatus comprising:

an identification acquirer configured to acquire an application identifier identifying a type name of application identification information from the downloaded application and a wireless communication terminal identifier identifying a type name of wireless communication terminal identification information;

an identification information acquirer configured to acquire contents of the application identification information and the wireless communication terminal identification information designated by the type name of the application identification information and the type name of the wireless communication terminal identification information acquired by the identifier acquirer;

a processor configured to generate a bind ID based on the contents acquired by the identification information acquirer;

a bind ID acquirer configured to acquire the bind ID identifying the downloaded application and the wireless communication terminal on which the application is mounted;

a discrimination ID acquirer configured to acquire attribute information identifying at least one of an application and a wireless communication terminal having permission to access a predetermined area in the removable external memory for storing the downloaded application; and an access controller configured to compare the bind ID with the attribute information, for permitting a transfer of the downloaded application to the predetermined area in the removable external memory when the bind ID matches the attribute information, and for preventing a transfer of the downloaded application to the predetermined area in the removable external memory when the bind ID does not match the attribute information.

* * * * *